United States Patent
Burton

(10) Patent No.: US 6,424,545 B2
(45) Date of Patent: Jul. 23, 2002

(54) EFFICIENT, DUAL-SOURCE, WIDE-INPUT RANGE, ISOLATED DC-DC CONVERTER WITH EFFECTIVE CURRENT LIMIT

(75) Inventor: Scott Richard Burton, Ottawa (CA)

(73) Assignee: Mitel Knowledge Corporation, Kanata (CA)

( * ) Notice: Subject to any disclaimer, the term of this patent is extended or adjusted under 35 U.S.C. 154(b) by 0 days.

(21) Appl. No.: 09/800,337

(22) Filed: Mar. 6, 2001

(30) Foreign Application Priority Data

Mar. 6, 2000 (GB) ............................................. 0005375

(51) Int. Cl.[7] ............................. H02M 3/335; H02J 1/10
(52) U.S. Cl. ...................................... 363/21.12; 307/23
(58) Field of Search ............................... 363/21.12, 29, 363/30, 31, 142, 143, 144; 307/66, 23, 24

(56) References Cited

U.S. PATENT DOCUMENTS 3,769,571 A   10/1973   Wilkinson
3,873,846 A * 3/1975   Morio et al. .................. 323/23
4,897,773 A   1/1990   Bilczo
5,282,122 A   1/1994   Summer

FOREIGN PATENT DOCUMENTS

DE   41 04 842 A1   8/1992
DE   41 04 842 A  * 8/1992   ................. 363/142
GB   1150959        5/1969

* cited by examiner

Primary Examiner—Rajnikant B. Patel
(74) Attorney, Agent, or Firm—Fay, Sharpe, Fagan, Minnich & McKee, LLP

(57) ABSTRACT

The present invention is a switching power supply having efficient light load regulation at high input voltage. The power supply comprises a pulse-width modulator integrated circuit along with two separate voltage buses. A transformer is connected to the first voltage bus via a first primary winding and is connected to the second voltage bus via a second primary winding both primary windings have a predetermined number of turns proportional to voltages supplied by the two voltage buses. The power supply further comprises a pair of switches connected to the two primary windings and driven by the integrated circuit.

20 Claims, 2 Drawing Sheets

Figure 1:
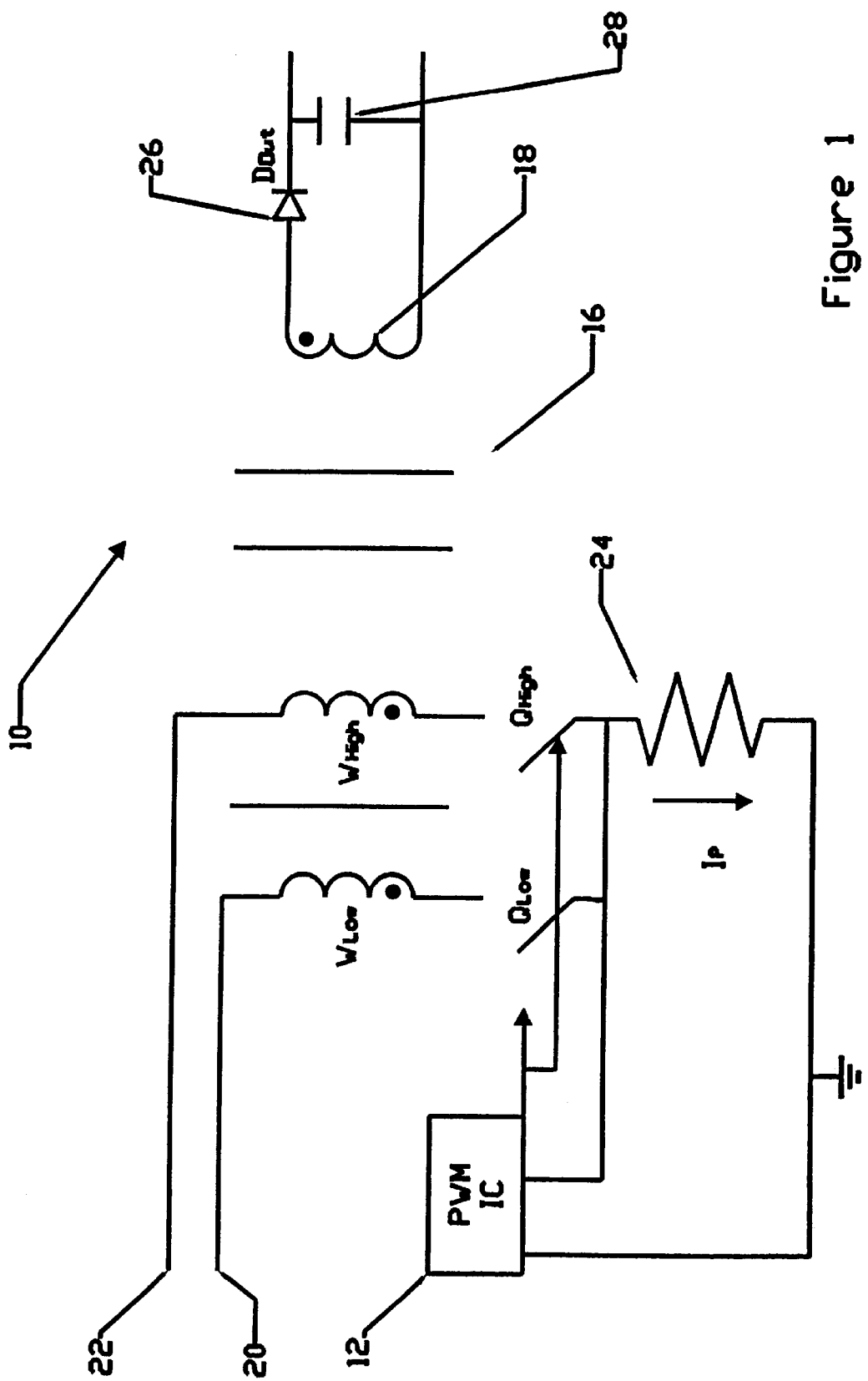

EFFICIENT, DUAL-SOURCE, WIDE-INPUT RANGE, ISOLATED DC-DC CONVERTER WITH EFFECTIVE CURRENT LIMIT

FIELD OF THE INVENTION

The present invention relates in general to power supplies and more specifically to a switching power supply.

BACKGROUND OF THE INVENTION

In the field of IP telephony equipment, an IP phone can be powered by a fixed-frequency, switching power supply employing an industry-standard discontinuous mode flyback topology. With this topology, the power supply output voltage is regulated by controlling the pulse width of the switching waveform in response to changes in both a source voltage and a power supply load. The pulse width control method is commonly known as pulse-width modulation (PWM). Inherent with this method is a potential for very narrow pulse widths at a maximum input voltage and a minimum load when the input operating voltage range is wide. However, the problem with narrow pulse widths is that integrated power supply controllers have a certain propagation delay from their control inputs to their power switch control outputs and the power switch also suffers from its own delay. These delays can become significant at narrow pulse widths particularly when the switching frequency is high and, as a result, the period of each cycle is relatively short.

There are other problems which arise from propagation delays on narrow pulse widths. Firstly, output voltage may be difficult to regulate at high input voltage and light load. Also, a peak primary current limit threshold that is suitable for the rated load at the minimum input voltage results in an excessive output load current at the maximum input voltage.

There are also problems that result from a wide input operating voltage range. One problem is that the blocking voltage rating of power supply output diodes may need to be high which preclude the use of Schottky diodes. Schottky diodes are beneficial for use at low output voltages due to their forward voltage drop, which is lower than standard fast-recovery diodes. This lower voltage drop results in a more efficient power supply, however, it also results in a lower reverse voltage rating. Standard Schottky diodes tend to have a maximum reverse voltage rating of 40V. Another problem is that the switching device must have both a high voltage rating, for operation at the high end of an input voltage range, and a high current rating, to conduct the larger currents associated with operation at a low end of the input voltage range. For efficient power supply operation this combination of high voltage and high current rating in a single device may necessitate the use of a physically larger and more expensive component than would otherwise be required if the input voltage range were narrower.

Presently, with respect to IP phone applications, the power supply is required to operate from two independent voltage sources, VSL and VSH, which have distinctly different voltage ranges. VSL provides a voltage range from 8VDC to 22VDC while VSH provides a voltage range from 22VDC to 56VDC. These voltage ranges result in operation of the power supply over a source voltage range from about 8VDC to 56VDC. For a given power supply load, this 7:1 range in input voltage results in a 7:1 range of PWM pulse width. The 7:1 PWM pulse width ratio, in turn, results in the problems associated with power supply operation using narrow pulse widths and wide input operating voltage range described above.

Prior art techniques have combined the two voltage sources together through coupling diodes to form a single voltage bus having an operating range spanning that of the two sources combined, which in this case would be 8VDC to 56VDC. A wide input voltage range power converter converts the bus voltage to the voltage required by the load. This has been implemented with standard power converter topologies such as the buck converter and the flyback converter. However, this technique still suffers from the problems described above.

SUMMARY OF THE INVENTION

The present invention is a switching power supply that improves light load regulation at a high input voltage by doubling the pulse width, thereby overcoming, the problems of in the prior art. The present invention also improves the current limit performance at high input voltage, provides lower reverse voltages for an output diode and optimizes the use of switching devices.

The apparatus of the present invention comprises two distinct voltage buses and an isolating transformer having two primary windings, each with its own associated switching device. Each winding is fed from its own voltage bus with the number of turns on each winding chosen to be proportional to the magnitude of its particular voltage bus. In this way, at any given time, power is supplied from whichever of the two buses is proportionately higher in voltage. The power supply operates from either voltage source alone, or with both sources present simultaneously, with transitions between sources being transparent to the output.

By keeping the two voltage buses separate, the duty cycle range for a given load in this phone application is reduced to 2.75:1 for the low voltage bus and an even lower 2.55:1 for the high voltage bus. This results in the minimum pulse width being over twice as wide as that associated with the 7:1 duty cycle range. This doubling of the pulse width significantly reduces the impact of controller and switching device delays and thus significantly improves light load regulation at high input voltage.

Also, the reduction of the impact of controller and switching device delays improves the current limit performance at high input voltage.

Another advantage of the present invention is that utilization of two, narrow, input voltage ranges allow the transformer turns ratios to be adjusted such that the output diode is subjected to a lower reverse voltage. This allows the use of Schottky diodes for output voltage rails of up to 5V. The benefit of using a Schottky diode is lower power dissipation and reduced component stress.

Finally, having two switching devices allows each device to be chosen so that its parameters are optimized for its particular operating conditions. For example, the low voltage bus device may conduct a high current without having to withstand a high voltage. The opposite is true for the high voltage bus device. This aligns well with switching device technology where the most easily fabricated, and therefore less expensive, devices optimize one parameter, either voltage or current, at the expense of the other. Thus two smaller devices, each optimized for their particular operating conditions, can replace one physically larger, more expensive, device.

According to an aspect of the present invention, there is provided a power supply having an output voltage, comprising: a first voltage source supplying a first DC voltage that is switched on and off by a first switch; a second voltage source supplying a second DC voltage that is switched on and off by a second switch; a transformer comprising a first primary winding connected to the first voltage source, a second primary winding connected to the second voltage source, and a secondary winding, where the secondary winding has an output for supplying the output voltage and where the first primary winding to the second primary winding has a turns ratio that is proportional to a voltage ratio of the first voltage source to the second voltage source, and a pulse-width modulator for switching the first switch and the second switch on and off at a duty cycle to control the output voltage.

According to another aspect of the present invention, there is provided A power supply having an output voltage, comprising: at least three voltage sources, each voltage source supplying a DC voltage and a current that is switched on and off by a switch; a transformer comprising a primary winding connected to each of the voltage sources, and a secondary winding, where the secondary winding has an output for supplying the output voltage and where the primary windings have turns ratios that are proportional to voltage ratios of the voltage sources; and a pulse-width modulator for switching the switch of each of the voltage sources on and off at a duty cycle to control the output voltage.

GENERAL DESCRIPTION OF THE DETAILED DRAWINGS

Figure 2:
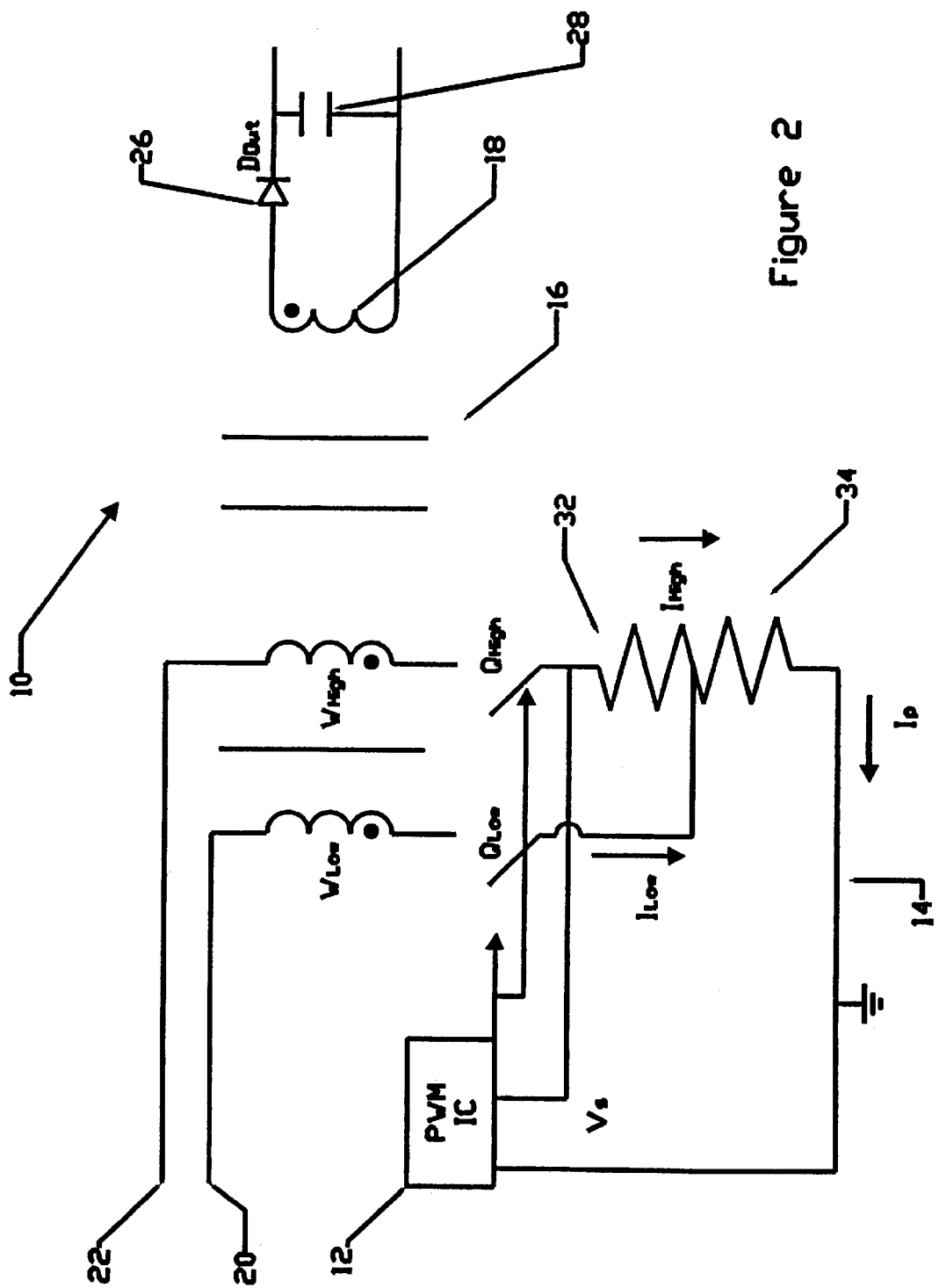

Embodiments of the present invention are described below with reference to the accompanying drawings, in which:

FIG. 1 is a schematic diagram of a first embodiment of a switching power supply of the present invention; and FIG. 2 is a schematic diagram of a second embodiment of a switching power supply.

DETAILED DESCRIPTION OF THE PREFERRED EMBODIMENTS

A schematic diagram of the switching power supply is shown in FIG. 1. The flyback switching power supply 10 comprises a pulse width modulator (PWM) IC 12 and a transformer 16 having two primary windings, $W_{Low}$ and $W_{High}$, and a secondary winding ($W_{Out}$) 18. The primary windings $W_{Low}$ and $W_{High}$ are connected to two separate voltage buses 20 and 22. Each of the primary windings $W_{Low}$ and $W_{High}$ is connected to associated switches $Q_{Low}$ and $Q_{High}$. The switches $Q_{Low}$ and $Q_{High}$ are driven by the PWM IC 12, which also senses current via a resistor 24 to control the current. The secondary winding 18 is connected in parallel with a capacitor 28 via an output diode 26. The capacitor 28 and the diode 26 function to rectify and filter an output voltage ($V_{out}$). As will be understood by one skilled in the art, the black dots within the windings $W_{Low}$, $W_{High}$ and 18 represent the positive terminal. PWM IC 12 further senses the $V_{out}$ (not shown) to accordingly control such as will be understood by one skilled in the art.

During operation, the signal output from IC 12 drives the two switching devices $Q_{Low}$ and $Q_{High}$ at a switching frequency such that both are either on or off at the same time. When the switching devices $Q_{Low}$ and $Q_{High}$ are on, the proportion of a primary current, $I_P$, that each conducts is a function of the voltage supplied by voltage buses 20 and 22 and the number of winding turns, N. For example, if $N_{Whigh}:N_{Wlow}=2.8:1$, $Q_{High}$ conducts significant current only when the voltage supplied by voltage bus 22 is more than 2.8 times higher than the voltage supplied by voltage bus 20.

Similarly, when, voltage bus 22 provides a voltage that is substantially lower than 2.8 times the voltage on voltage bus 20, $Q_{Low}$ conducts the current. There is also a transition range slightly above and below the 2.8 times voltage source multiplier when both devices and their respective windings share the primary current, $I_P$.

When the switching devices $Q_{Low}$ and $Q_{High}$ are off, both must withstand a flyback voltage. The flyback voltage is equal to the output voltage multiplied by the primary to secondary turns ratio plus the input bus voltage, or $$V_{Flyback}=V_{Wout}\times N_{primary}/N_{Wout}+V_S$$

where $N_{primary}=N_{Whigh}$ and $N_{Wlow}$ for $Q_{High}$ and $Q_{Low}$ respectively; and $V_{Wout}=V_{out}+V_{Dout}$; and $V_S=V_{SHigh}+V_{SLow}$ (the voltages supplied by voltage buses 22 and 20 respectively).

Therefore, with $V_{out}=5V$, $V_{Dout}=0.3V$, $N_{WHigh}:N_{Wout}=2.15:1$, and $N_{WLow}:N_{Wout}=0.77:1$, the switching devices $Q_{Low}$ and $Q_{High}$ are subjected to maximum voltages of 26.1 V and 67.4 V respectively, at a ratio of 2.58:1. With respect to current, assuming comparable efficiency, the ratio between the maximum currents conducted by $Q_{Low}$ and $Q_{High}$ is inversely proportional to their respective minimum input bus voltages supplied by voltage buses 20 and 22. For example, with voltage bus 20 supplying a voltage of 8V and voltage bus 22 supplying a voltage of 22V, the maximum current conducted by $Q_{Low}$ is therefore 22/8=2.75 times the current conducted by $Q_{High}$. Thus, in comparing the two switching devices, $Q_{Low}$ must carry 2.75 times the current, but $Q_{High}$ must withstand 2.58 times the voltage. Therefore, each switching device $Q_{Low}$ or $Q_{High}$ can be chosen accordingly to optimize the power supply design.

When $Q_{Low}$ and $Q_{High}$ are on, the output diode 26 is off and is required to withstand a reverse voltage equal to the input bus voltage multiplied by the primary to secondary turns ratio plus the output voltage. Therefore, if the voltage on voltage bus 22 is 56V, output diode 26 is required to block a reverse voltage equal to 56/2.15+5=31V, and if the voltage on voltage bus 20 is 22V, the output diode 26 is required to block a reverse voltage of 22/0.77+5=33.6V. As will be understood, since both voltages are below 40V, a standard Schottky diode can be employed as the output diode 26.

In another embodiment, a two-resistor current sense network is implemented to tailor current limit to the voltage bus that is predominant at any given time. With reference to FIG. 2, the switch $Q_{High}$ current is sensed by the PWM IC 12 via a pair of resistors 32 and 34. The $Q_{Low}$ switching device current is sensed by the PWM IC 12 via only the second resistor 34. When switch $Q_{Low}$ is conducting, a current $I_{Low}$ flows through the second resistor 34 and generates a voltage ($V_{sense}$) that is sensed by the PWM IC 12. The PWM IC 12 adjusts this voltage, as necessary, to control the pulse width, and also to fix a maximum value for the voltage that establishes a primary current limit threshold. When switch $Q_{High}$ is conducting, a current $I_{High}$ flows through a higher resistance value formed by the sum of the pair of resistors 32 and 34. Since the resistance value is higher but the maximum voltage value ($V_{sensemax}$) remains unchanged, a lower peak current limit value for the high voltage source range threshold is achieved. This lower peak current limit counteracts the tendency for the output current limit value to increase with input voltage and reduces component stress under a high input voltage overload of the output.

It will be appreciated that, although only two embodiments of the invention have been described and illustrated in detail, various changes and modification may be made. For example, additional input sources can be accommodated by adding one primary winding and one switching device for each source. This can be used wherever a low-power, multi-source power supply is required and would be suitable for both isolated as well as non-isolated applications. All such changes and modifications may be made without departing from the sphere and scope of the invention as defined by the claims appended herein.

What is claimed is:

1. A power supply having an output voltage, comprising:
    a first voltage source supplying a first DC voltage that is switched on and off by a first switch;
    a second voltage source supplying a second DC voltage that is switched on and off by a second switch;
    a transformer comprising a first primary winding connected to the first voltage source, a second primary winding connected to the second voltage source, and a secondary winding, where the secondary winding has an output for supplying the output voltage and where the first primary winding to the second primary winding has a turns ratio that is proportional to a voltage ratio of the first voltage source to the second voltage source; and
    a pulse-width modulator for switching the first switch and the second switch on and off at a duty cycle to control the output voltage.

2. The power supply of claim 1, wherein the first DC voltage varies over a first voltage range and the second DC voltage varies over a second voltage range.

3. The power supply of claim 2, wherein the output voltage is supplied from whichever of the first voltage source and the second voltage source is proportionally higher in voltage.

4. The power supply of claim 2, wherein the first voltage range and the second voltage range do not overlap.

5. The power supply of claim 1, further comprising a current limiting system to limit a first current of the first voltage source and a second current of the second voltage source.

6. The power supply of claim 5, wherein the current limiting system comprises a resistor to generate a voltage drop for sensing a combination of the first current and the second current by the pulse-width modulator, where the pulse-width modulator varies the duty cycle to limit the first current and the second current.

7. The power supply of claim 2, wherein the second voltage range has a second peak voltage which is higher than a first peak voltage of the first voltage range, and
    further comprising a current limiting system to limit a first current of the first voltage source and a second current of the second voltage source that comprises
        a first resistor and a second resistor where the first current passes through the first resistor and the second current passes through the first resistor and the second resistor such that the pulse-width modulator senses a voltage drop across the first resistor and the second resistor and accordingly changes the duty cycle to limit current.

8. The power supply of claim 7, wherein the first resistor and the second resistor are scaled such that the voltage drop sensed by the pulse-width modulator is higher for a given current from the second voltage source versus the first voltage source.

9. The power supply of claim 1, further comprising a capacitor connected in parallel with the secondary winding via a diode for rectifying and filtering the output of the secondary winding, and wherein the turns ratio is set for a reduced reverse voltage on the diode.

10. The power supply of claim 9, wherein the diode is a Schottky diode.

11. A power supply having an output voltage, comprising:
    at least two voltage sources, each voltage source supplying a DC voltage and a current that is switched on and off by a switch;
    a transformer comprising a primary winding connected to each of the voltage sources, and a secondary winding, where the secondary winding has an output for supplying the output voltage and where the primary windings have turns ratios that are proportional to voltage ratios of the voltage sources; and
    a pulse-width modulator for switching the switch of each of the voltage sources on and off at a duty cycle to control the output voltage.

12. The power supply of claim 11, wherein each of the DC voltages varies over a voltage range.

13. The power supply of claim 12, wherein the output voltage is substantially supplied from the voltage source that is proportionally higher in voltage than the other voltage sources.

14. The power supply of claim 12, wherein the voltage ranges do not overlap.

15. The power supply of claim 11, further comprising a current limiting system to limit the current of each of the voltage sources.

16. The power supply of claim 15, wherein the current limiting system comprises a resistor to generate a voltage drop for sensing a combination of the currents of the voltage sources by the pulse-width modulator, where the pulse-width modulator varies the duty cycle to limit the currents.

17. The power supply of claim 12, wherein each of the voltage ranges have a peak voltage and which peak voltages form a peak range, and
    further comprising a current limiting system to limit the currents of the voltage sources that comprises
        at least three resistors where the currents of the voltage sources having greater peak voltages passes through more of the resistors such that the pulse-width modulator senses a voltage drop across the resistors and accordingly changes the duty cycle to limit current.

18. The power supply of claim 17, wherein the resistors are scaled such that the voltage drop sensed by the pulse-width modulator is higher for a given current from the voltage sources with a higher peak voltage.

19. The power supply of claim 11, further comprising a capacitor connected in parallel with the secondary winding via a diode for rectifying and filtering the output of the secondary winding, and wherein the turns ratios are set for a reduced reverse voltage on the diode.

20. The power supply of claim 19, wherein the diode is a Schottky diode.

* * * * *